US011984652B2

(12) United States Patent
Hashiguchi

(10) Patent No.: US 11,984,652 B2
(45) Date of Patent: May 14, 2024

(54) ANTENNA ASSEMBLY

(71) Applicant: JAPAN AVIATION ELECTRONICS INDUSTRY, LIMITED, Tokyo (JP)

(72) Inventor: Osamu Hashiguchi, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 0 days.

(21) Appl. No.: 17/895,003

(22) Filed: Aug. 24, 2022

(65) Prior Publication Data

US 2023/0089753 A1 Mar. 23, 2023

(30) Foreign Application Priority Data

Sep. 21, 2021 (JP) ................................ 2021-152819

(51) Int. Cl.
*H01Q 1/36* (2006.01)
*H01Q 1/50* (2006.01)
*H01R 9/00* (2006.01)
*H01R 9/05* (2006.01)

(52) U.S. Cl.
CPC ................. *H01Q 1/36* (2013.01); *H01Q 1/50* (2013.01)

(58) Field of Classification Search
CPC ............ H01Q 1/36; H01Q 1/364; H01Q 1/38; H01Q 1/50; H01R 9/0518; H01R 12/675; H01R 9/00; H01R 9/05; H01R 12/69
See application file for complete search history.

(56) References Cited

U.S. PATENT DOCUMENTS

| | | | | |
|---|---|---|---|---|
| 3,829,822 | A * | 8/1974 | Geiser | H01R 4/2466 439/402 |
| 5,316,506 | A | 5/1994 | Ito | |
| 5,370,560 | A | 12/1994 | Ito | |
| 2012/0050119 | A1* | 3/2012 | Wang | H01Q 5/364 343/728 |
| 2018/0083353 | A1* | 3/2018 | Tseng | H01Q 5/364 |
| 2020/0287306 | A1* | 9/2020 | Hashiguchi | H01R 12/675 |
| 2020/0412024 | A1* | 12/2020 | Hashiguchi | H01Q 7/00 |

FOREIGN PATENT DOCUMENTS

| | | |
|---|---|---|
| JP | H05152011 A | 6/1993 |
| JP | 2001298824 A | 10/2001 |

* cited by examiner

*Primary Examiner* — Thai Pham
(74) *Attorney, Agent, or Firm* — Holtz, Holtz & Volek PC

(57) ABSTRACT

An antenna assembly includes an antenna body formed of a sheet metal, an electric cable, and a conductive film. The antenna body includes at least one crimp portion. The conductive film has a main portion and at least one connected portion extending from the main portion. The electric cable has a conductor portion 46. The at least one crimp portion is crimped to the conductor portion in a state that at least one connected portion lies between the conductor portion and the at least one crimp portion.

6 Claims, 4 Drawing Sheets

ANTENNA ASSEMBLY

CROSS REFERENCE TO RELATED APPLICATIONS

This application is based on and claims priority under 35 U.S.C. § 119 to Japanese Patent Application No. JP2021-152819 filed Sep. 21, 2021, the contents of which are incorporated herein in their entirety by reference.

BACKGROUND OF THE INVENTION

This invention relates to an antenna assembly which is provided with a conductive film.

Referring to FIG. 5, US 2012/0050119 A1 (Patent Document 1) discloses an antenna assembly 900 of this type. The antenna assembly 900 is provided with an antenna body 910, a coaxial cable 930 and a conductive film 950. The antenna body 910 has a feeding connection portion 914 and a ground portion 916. The coaxial cable 930 is provided with a central conductor 934 and an outer conductor 936. The central conductor 934 is connected to the feeding connection portion 914. The outer conductor 936 is connected to the ground portion 916. The conductive film 950 is connected to the ground portion 916. The conductive film 950 connected to the ground portion 916 enlarges a ground region of the antenna assembly 900 to improve an antenna performance of the antenna assembly 900.

SUMMARY OF THE INVENTION

In the antenna assembly 900 of Patent Document 1, the conductive film 950 must be fixed to the ground portion 916 of the antenna body 910 by solder or the like. Accordingly, in such an antenna assembly, it is required to improve workability in fixing a conductive film to an antenna body.

It is therefore an object of the present invention to provide an antenna assembly which can improve workability in fixing a conductive film to an antenna body.

One aspect of the present invention provides an antenna assembly comprising: an antenna body formed of a sheet metal; an electric cable; and a conductive film. The antenna body is provided with at least one crimp portion. The conductive film has a main portion and at least one connected portion which extends from the main portion. The electric cable has a conductor portion. The at least one crimp portion is crimped to the conductor portion in a state that the at least one connected portion lies between the conductor portion and the at least one crimp portion.

In the antenna assembly of the above-mentioned aspect of the present invention, the antenna body is provided with the at least one crimp portion, and the conductive film has the at least one connected portion. The at least one crimp portion is crimped to the conductor portion in the state that the at least one connected portion lies between the conductor portion of the electric cable and the at least one crimp portion. With this structure, in the antenna assembly of the above-mentioned aspect of the present invention, soldering is unnecessary to fix the conductive film to the antenna body. In other words, in the antenna assembly of the above-mentioned aspect of the present invention, workability in fixing the conductive film to the antenna body is improved.

An appreciation of the objectives of the present invention and a more complete understanding of its structure may be had by studying the following description of the preferred embodiment and by referring to the accompanying drawings.

Figure 1:
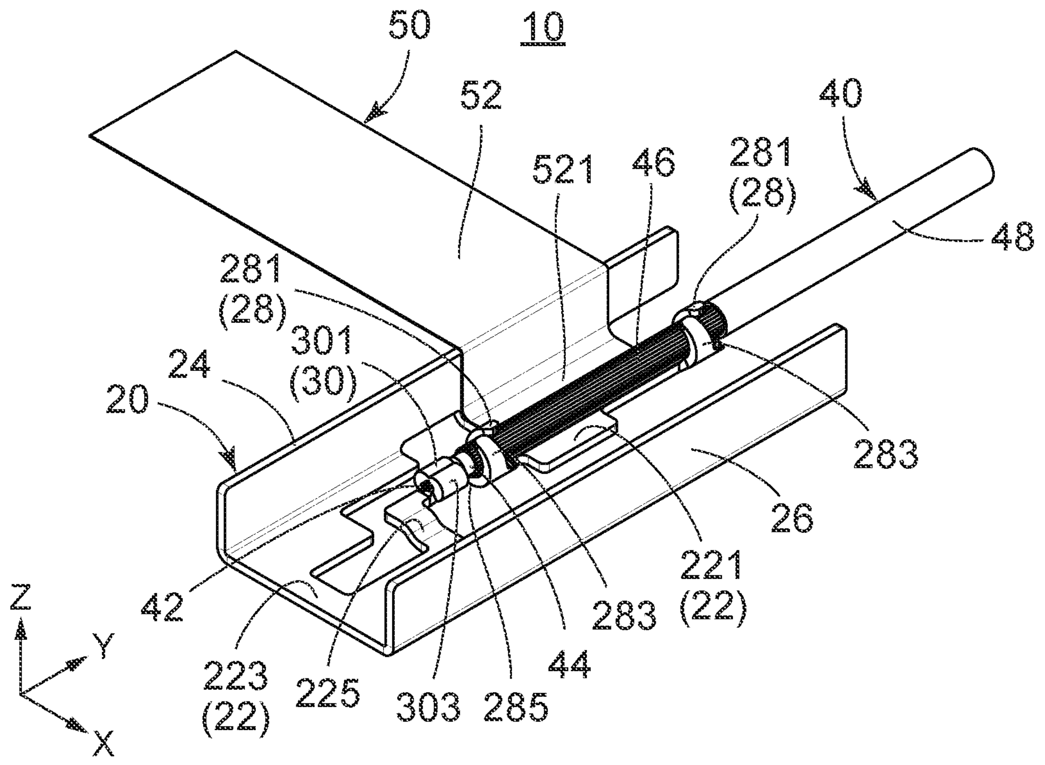
FIG. 1 is a perspective view showing an antenna assembly according to a first embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Referring to FIG. 1, an antenna assembly 10 according to an embodiment of the present invention is provided with an antenna body 20 formed of a sheet metal, an electric cable 40 and a conductive film 50.

Figure 2:
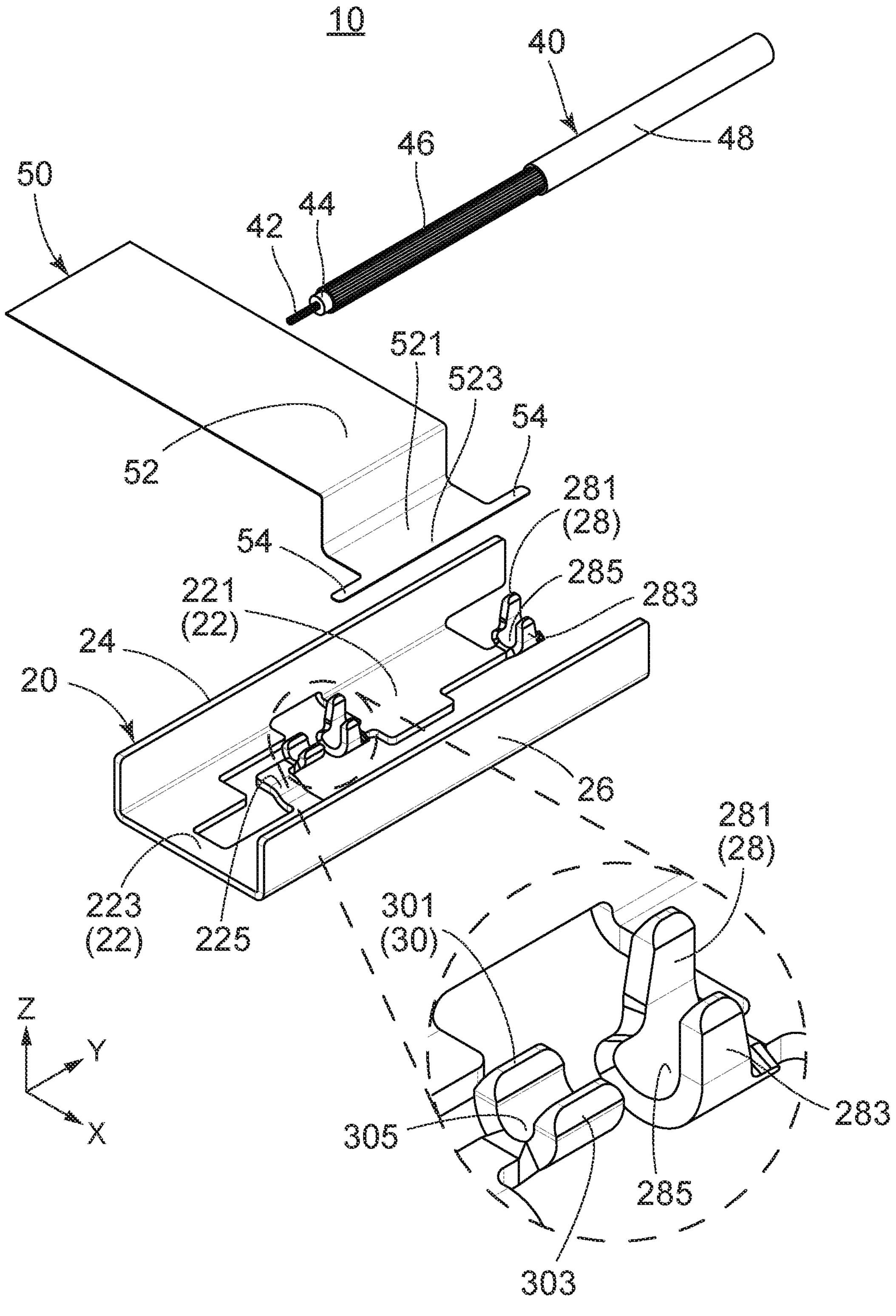
FIG. 2 is an exploded view showing the antenna assembly of FIG. 1. A core wire connection portion, one of crimp portions and the vicinity of them are shown in an enlarged fashion.

Referring to FIG. 2, the antenna body 20 has a bottom plate portion 22, a first side portion 24 and a second side portion 26. The bottom plate portion 22 has a first bottom plate portion 221 and a second bottom plate portion 223. In the present embodiment, the antenna body 20 has a longitudinal direction along a front-rear direction. In a lateral direction perpendicular to the longitudinal direction, the bottom plate portion 22 is positioned between the first side portion 24 and the second side portion 26. In the present embodiment, the front-rear direction is a Y-direction. A negative Y-direction is directed forward while a positive Y-direction is directed rearward. The lateral direction is an X-direction. However, the present invention is not limited thereto. A shape of the antenna body 20 may be freely changed, provided that desired characteristics are obtained.

As understood from FIG. 2, in the present embodiment, each of the first side portion 24 and the second side portion 26 is a flat sheet with a rectangular shape long in the front-rear direction. The first side portion 24 and the second side portion 26 are apart from each other in the lateral direction and arranged in parallel with each other.

As understood from FIG. 2, each of the first bottom plate portion 221 and the second bottom plate portion 223 is a flat sheet perpendicular to an up-down direction. In the present embodiment, the up-down direction is a Z-direction. A positive Z-direction is directed upward while a negative Z-direction is directed downward. The first bottom plate portion 221 is continuous to a lower end of the first side portion 24. In the front-rear direction, the first bottom plate portion 221 extends rearward from a middle portion of the first side portion 24, but the first bottom plate portion 221 does not reach a rear end of the first side portion 24. The second bottom plate portion 223 is continuous to both of the lower end of the first side portion 24 and a lower end of the second side portion 26. With this structure, the second bottom plate portion 223 connects a front-end portion of the first side portion 24 and a front-end portion of the second side portion 26 to each other. The first bottom plate portion 221 and the second bottom plate portion 223 are not directly connected to each other.

As shown in FIG. 2, in the present embodiment, the antenna body 20 is provided with two crimp portions 28. In detail, the crimp portions 28 protrude forward and rearward, respectively, from the first bottom plate portion 221. In addition, the crimp portions 28 are arranged to lie in a straight line. However, the present invention is not limited thereto. The number of the crimp portion(s) 28 should be at least one. In other words, the antenna body 20 should be provided with at least one crimp portion 28.

As shown in FIG. 2, each of the crimp portions 28 has two crimp pieces 281 and 283 and a bottom portion 285 positioned between the crimp pieces 281 and 283. In a state before crimped, the crimp pieces 281 and 283 are positioned on both sides of the bottom portion 285 in the lateral direction and extend upward from both ends of the bottom portion 285. In the present embodiment, the crimp pieces 281 and 283 are different in position from each other in the front-rear direction. Moreover, the crimp pieces 281 and 283 are different from each other in length. However, the present invention is not limited thereto. The crimp pieces 281 and 288 may be coincide in position with each other in the front-rear direction. Moreover, the crimp pieces 281 and 283 may be equal to each other in length.

As shown in FIG. 2, the antenna body 20 is further provided with a core wire connection portion 30. In the present embodiment, the core wire connection portion 30 is provided to protrude rearward from an extension portion 225 extending from the second bottom plate portion 223. The core wire connection portion 30 has two crimp pieces 301 and 303 and a bottom portion 305 positioned between the crimp pieces 301 and 303. In a state before crimped, the crimp portions 28 are positioned at both sides of the bottom portion 305 in the lateral direction and extend upward from both ends of the bottom portion 305. In the present embodiment, the crimp pieces 301 and 303 are coincide in position with each other in the front-rear direction. Moreover, the crimp pieces 301 and 303 are equal to each other in length. However, the present invention is not limited thereto. The crimp pieces 301 and 303 may be different in position from each other in the front-rear direction. Moreover, the crimp pieces 301 and 303 may be different from each other in length.

As understood from FIG. 2, the core wire connection portion 30 and the crimp portions 28 are arranged in a straight line when viewed along the up-down direction. Moreover, the core wire connection portion 30 is positioned upward of the crimp portions 28 in the up-down direction. However, the present invention is not limited thereto. The core wire connection portion 30 and the crimp portions 28 may be coincide in position with each other in the up-down direction.

As understood from FIG. 2, in the present embodiment, the antenna body 20 is formed of a single sheet metal. In detail, the antenna body 20 is made by punching and bending the sheet metal. Accordingly, the crimp portions 28 and the core wire connection portion 30 are parts of the antenna body 20. In other words, each of the crimp portions 28 and the core wire connection portion 30 is made of a part of the sheet metal forming the antenna body 20.

As shown in FIG. 2, the electric cable 40 is a coaxial cable in the present embodiment. In detail, the electric cable 40 has a core wire 42, an insulation body 44, an outer conductor 46 which is a conductor portion and an outer sheath 48. In the present embodiment, each of the core wire 42 and the outer conductor 46 is formed of a plurality of elemental wires. However, the present invention is not limited thereto. The electric cable 40 may be a cable other than the coaxial cable, provided that it has a signal line and a ground line. Moreover, the core wire 42 may be a single wire, and the outer conductor 46 may be a twisted wire.

As shown in FIG. 2, the core wire 42 has an exposed part which is exposed outside at an end of the electric cable 40. On the other hand, the outer conductor 46 has an exposed part which is exposed outside behind the exposed part of the core wire 42 and which has a predetermined length. Here, the predetermined length is longer than the shortest distance between the crimp portions 28. In other words, the predetermined length is a length allowing the crimp portions 28 to crimp the exposed part of the outer conductor 46.

As shown in FIG. 2, the conductive film 50 has a main portion 52 and two connected portions 54. The conductive film 50 is formed of a copper tape or a copper foil, for example. In the present embodiment, the main portion 52 has a strip-shaped with a fixed width in the front-rear direction and extends in the lateral direction. In the present embodiment, a width size of the main portion 52 is smaller than the shortest distance size between the crimp portions 28 of the antenna body 20. An end portion 521 of the main portion 52 is bent to conform to a shape of the antenna body 20. However, the present invention is not limited thereto. The shape of the main portion 52 may be freely designed. For example, the main portion 52 may have two or more parts which are different from each other in width. The main portion 52 does not have to extend in one direction and may be bent at the middle thereof.

As shown in FIG. 2, in the present embodiment, the connected portions 54 of the conductive film 50 are arranged in a straight line and protrude from the main portion 52. In detail, the connected portions 54 protrude forward and rearward, respectively, at an end of the main portion 52. A distance between tips of the connected portions 54 is longer than the shortest distance between the crimp portions 28 of the antenna body 20. However, the present invention is not limited thereto. The conductive film 50 should have at least one connected portion 54. The connected portion 54 does not have to protrude, provided that it extends from the main portion 52.

Figure 3:
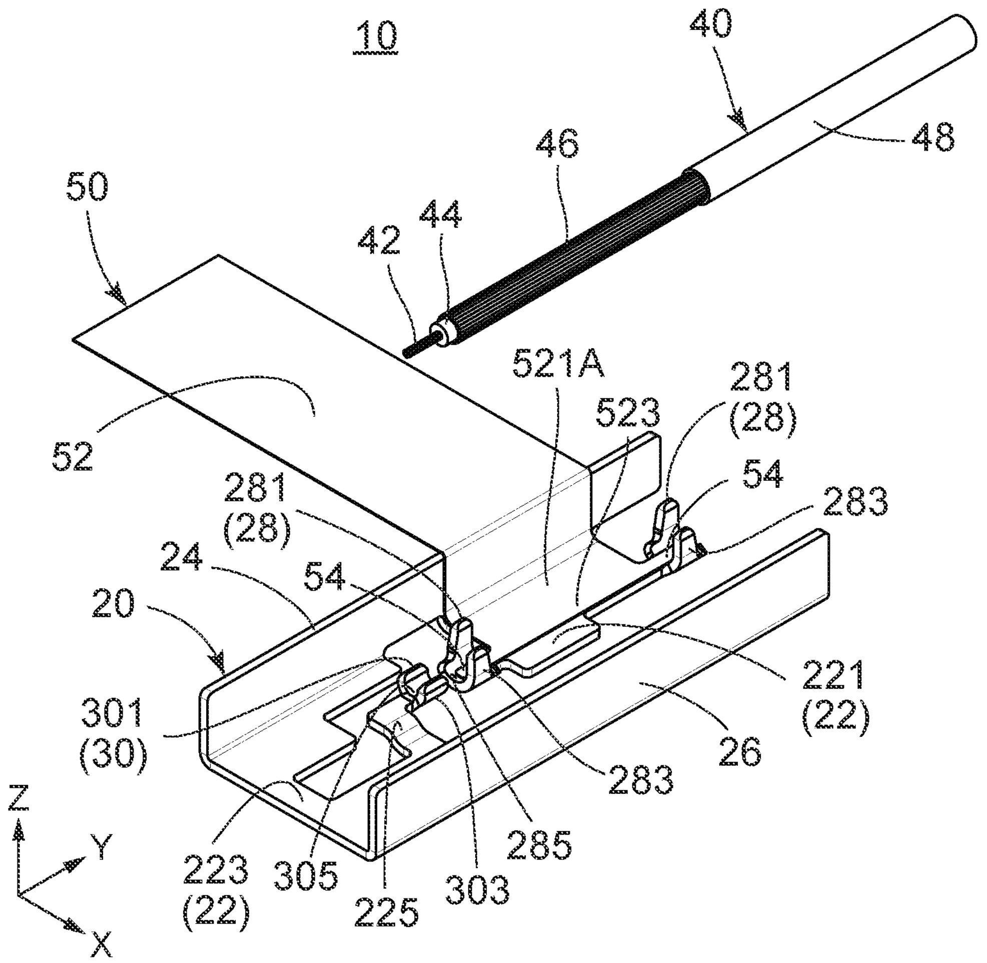
FIG. 3 is a perspective view showing an example of a state in a middle of assembling the antenna assembly of FIG. 1.

Referring to FIG. 3, an end portion 521A of the main portion 52 of the conductive film 50 is disposed on the antenna body 20. The connected portions 54 correspond to the crimp portions 28, respectively, and each of the connected portions 54 is disposed at least in part on the bottom portion 285 of the crimp portion 28 corresponding thereto. In order to fix the conductive film 50 to the antenna body 20, an adhesive layer (not shown) is provided on at least a part of an undersurface of the end portion 521A of the main portion 52 of the conductive film 50. With this structure, the conductive film 50 is fixed to the antenna body 20. Incidentally, the adhesive layer may or may not be provided between the connected portion 54 and the bottom portion 285 of the crimp portion 28.

Figure 4:
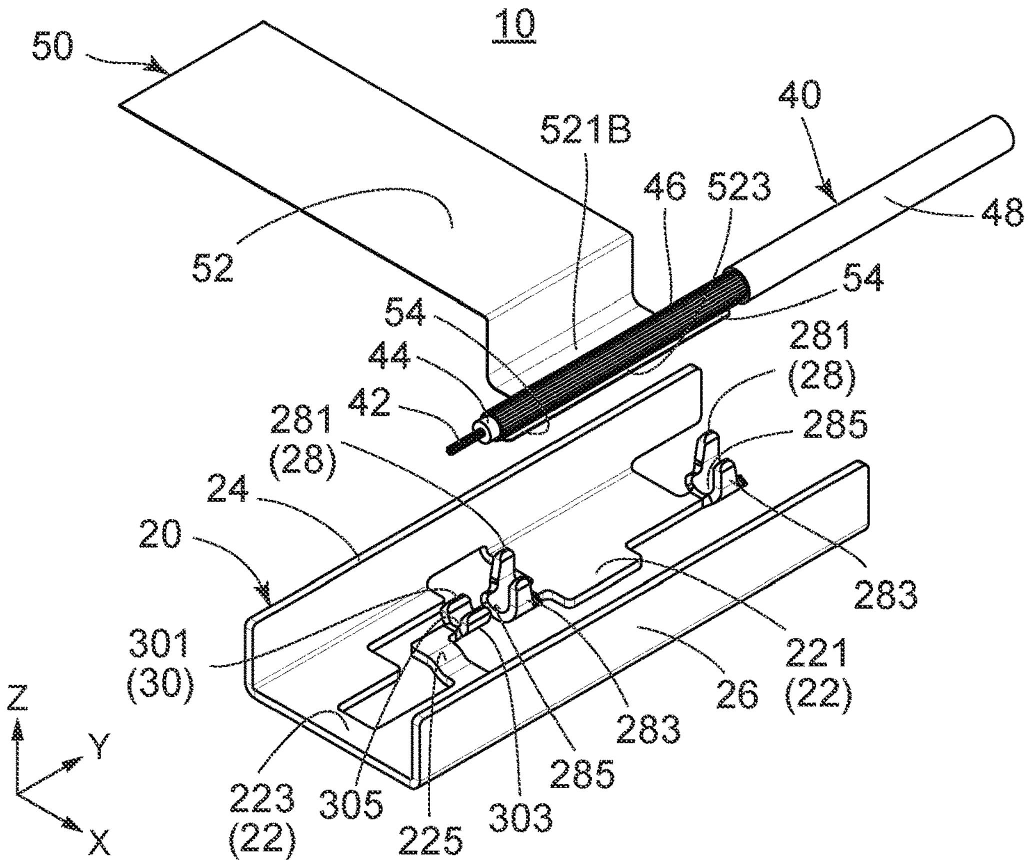
FIG. 4 is a perspective view showing another example of a state in a middle of assembling the antenna assembly of FIG. 1.
Figure 5:
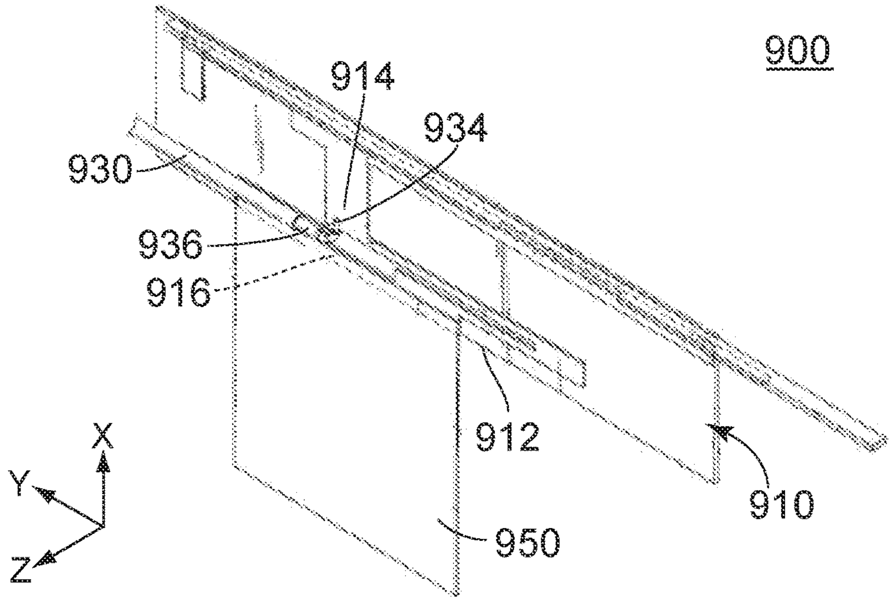
FIG. 5 PRIOR ART
FIG. 5 is a perspective view showing an antenna assembly of Patent Document 1.

Referring to FIG. 4, the electric cable 40 is disposed, in part, on an end portion 521 B of the main portion 52 of the conductive film 50. In detail, the electric cable 40 is disposed on the end portion 521 of the conductive film 50 in part so that the exposed part of the outer conductor 46 of the electric cable 40 is positioned right above both of the connected portions 54 of the conductive film 50. In order to fix the electric cable 40 to the conductive film 50, an adhesive layer (not shown) is provided on a top surface of the end portion 521 B of the main portion 52 of the conductive film 50 at least in part. With this structure, the electric cable 40 is fixed to the conductive film 50. Incidentally, the adhesive layer may or may not be provided between the connected portion 54 and the outer conductor 46.

From a state shown in FIG. 3 or 4, the electric cable 40 is attached to the antenna body 20. As a result, a state shown in FIG. 1 is obtained. In the state shown in FIG. 1, the core wire connection portion 30 is crimped to the core wire 42 of the electric cable 40. Moreover, each of the crimp portions 28 is crimped to the outer conductor 46. In detail, the crimp pieces 301 and 303 of the core wire connection portion 30 are crimped to sandwich the core wire 42 between them and the bottom portion 305. Moreover, the crimp pieces 281 and 283 of each of the crimp portions 28 are crimped to sandwich the outer conductor 46 and the connected portion 54 between them and the bottom portion 285. In other words, each of the crimp portions 28 is crimped to the outer conductor 46 in a state that the connected portion 54 corresponding thereto lies between the outer conductor 46 and the crimp portion 28. In the present embodiment, each of the connected portions 54 is sandwiched between the bottom portion 285 of the crimp portion 28 corresponding thereto and the outer conductor 46 of the electric cable 40.

As understood from FIGS. 1 and 3, the end portion 521 of the main portion 52 of the conductive film 50 has a part which is in contact with and electrically connected to the outer conductor 46. Alternatively, as understood from FIGS. 1 and 4, the end portion 521 of the main portion 52 of the conductive film 50 has a part which is in contact with and electrically connected to the antenna body 20. Thus, the end portion 521 of the main portion 52 of the conductive film 50 has an auxiliary connection portion 523 which is electrically connected to at least one of the outer conductor 46 and the antenna body 20. In other words, the conductive film 50 is provided with the auxiliary connection portion 523. Existence of the auxiliary connection portion 523 improves electric connection between the outer conductor 46 and the antenna body 20.

As understood from FIGS. 1, 3 and 4, the auxiliary connection portion 523 extends in a predetermined direction and is positioned at a location deviated from the connected portions 54 in the predetermined direction. In the present embodiment, the auxiliary connection portion 523 is positioned between the connected portions 54 or between the crimp portions 28 in the predetermined direction. In addition, the auxiliary connection portion 523 is in contact with at least one of the outer conductor 46 of the electric cable 40 and the antenna body 20. In the present embodiment, the predetermined direction is the front-rear direction.

As mentioned above, in the present embodiment, the conductive film 50 is fixed to the antenna body 20 by using the crimp portions 28 which is crimped to the outer conductor 46. In other words, the antenna assembly 10 of the present embodiment has a structure in which the conductive film 50 can be fixed to the antenna body 20 without using solder. Accordingly, the antenna assembly 10 of the present embodiment has superior workability in fixing the conductive film 50 to the antenna body 20.

Although the specific explanation about the present invention is made above with reference to the embodiments, the present invention is not limited thereto but susceptible of various modifications and alternative forms without departing from the spirit of the invention. For example, the following modifications are possible.

In the aforementioned embodiment, each of the connected portions 54 of the conductive film 50 is sandwiched between the bottom portion 285 of the crimp portion 28 corresponding thereto and the outer conductor 46 of the electric cable 40. However, the connected portion 54 of the conductive film 50 may be sandwiched between at least one of the crimp pieces 281 and 283 of the crimp portion 28 and the outer conductor 46. For example, when the main portion 52 of the conductive film 50 is longer in the positive X-direction, the connected portion 54 is in contact with the crimp piece 283 in a state before cramped. In that case, the connected portion 54 is sandwiched between the crimp piece 283 (or the crimp pieces 281 and 283) and the outer conductor 46. When the main portion 52 of the conductive film 50 is yet longer in the positive X-direction, the connected portion 54 protrudes upward of the crimp piece 283 at least in part in the state before cramped. In that case, the connected portion 54 is sandwiched between the crimp piece 281 (or the crimp pieces 281 and 283) and the outer conductor 46. At any rate, at least one crimp portion 28 should be crimped to the outer conductor 46 in a state that at least one connected portion 54 lies between the outer conductor 46 and the at least one crimp portion 28.

In the aforementioned embodiment, the connected portions 54 of the conductive film 50 correspond to the crimp portions 28 of the antenna body 20 in a one-by-one relationship. However, the connected portions 54 may be smaller than the crimp portions 28 in number. For example, one of the connected portions 54 may be absent, provided that one of the crimp portions 28 corresponds to the other of the connected portions 54.

In the aforementioned embodiment, the conductive film 50 and the electric cable 40 are arranged to be perpendicular to each other. However, the conductive film 50 and the electric cable 40 do not have to be perpendicular to each other. For example, the conductive film 50 and the electric cable 40 may extend in the same direction. In that case, the conductive film 50 may extend in a direction perpendicular to or parallel to the longitudinal direction of the antenna body 20. In addition, the connected portion(s) 54 may be one in number. The connected portion 54 may extend in a direction same as an extending direction of the conductive film 50.

In the aforementioned embodiment, the bottom portion 285 of each of the crimp portions 28 is positioned at a location substantially identical to that of the bottom plate portion 22 of the antenna body 20 in the up-down direction. However, the bottom portion 285 of each of the crimp portions 28 may be positioned upward of the bottom plate portion 22 of the antenna body 20 in the up-down direction. Even in that case, it is necessary to maintain a state that the auxiliary connection portion 523 of the conductive film 50 is pressed on the antenna body 20 directly or indirectly.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. An antenna assembly comprising:

an antenna body formed of a sheet metal;

an electric cable; and a conductive film, wherein:
the antenna body includes at least one crimp portion;
the conductive film has a main portion and at least one connected portion which extends from the main portion;
the electric cable has a conductor portion;
the at least one crimp portion of the antenna body is crimped to the conductor portion of the electric cable in a state that the at least one connected portion of the conductive film lies between the conductor portion of the electric cable and the at least one crimp portion of the antenna body, and
the conductive film includes an auxiliary connection portion extending in a predetermined direction, and the auxiliary connection portion is in contact with at least one of the antenna body and the conductor portion of the electric cable.

2. The antenna assembly as recited in claim 1, wherein the auxiliary connection portion is positioned at a location deviated from the at least one connected portion in the predetermined direction.

3. The antenna assembly as recited in claim 2, wherein:
the at least one crimp portion comprises two crimp portions; and
the auxiliary connection portion is positioned between the crimp portions in the predetermined direction.

4. The antenna assembly as recited in claim 1, wherein:
the electric cable is a coaxial cable;
the conductor portion is an outer conductor of the coaxial cable;
the coaxial cable further has a core conductor;
the antenna body is provided with a core wire connection portion which is crimped to the coaxial conductor; and
the core wire connection portion and the at least one crimp portion are arranged in a straight line.

5. The antenna assembly as recited in claim 4, wherein:
the sheet metal is a single sheet metal; and
each of the core wire connection portion and the at least one crimp portion is a part of the antenna body formed of the sheet metal.

6. The antenna assembly as recited in claim 1, wherein:
the crimp portion has two crimp pieces and a bottom portion which is positioned between the crimp pieces; and
the connected portion is sandwiched between the bottom portion and the conductor portion of the electric cable.

* * * * *